(12) United States Patent
Lee et al.

(10) Patent No.: US 10,928,700 B2
(45) Date of Patent: Feb. 23, 2021

(54) NANO ANTENNA STRUCTURE AND METHOD OF MANUFACTURING THE SAME

(71) Applicant: SAMSUNG ELECTRONICS CO., LTD., Suwon-si (KR)

(72) Inventors: Changbum Lee, Seoul (KR); Sunil Kim, Osan-si (KR); Duhyun Lee, Yongin-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/683,882

(22) Filed: Aug. 23, 2017

(65) Prior Publication Data

US 2018/0059506 A1 Mar. 1, 2018

(30) Foreign Application Priority Data

Aug. 23, 2016 (KR) .................. 10-2016-0106988

(51) Int. Cl.
*G02F 1/29* (2006.01)
(52) U.S. Cl.
CPC .......... *G02F 1/292* (2013.01); *G02F 2203/15* (2013.01)
(58) Field of Classification Search
None
See application file for complete search history.

(56) References Cited

U.S. PATENT DOCUMENTS

| 8,711,463 B2 | 4/2014 | Han et al. | |
| 2005/0002084 A1 | 1/2005 | Wan | |
| 2013/0148194 A1 | 6/2013 | Altug et al. | |
| 2014/0293529 A1* | 10/2014 | Nair | H01Q 1/2291 361/679.31 |
| 2015/0146180 A1* | 5/2015 | Lee | G03F 7/2014 355/55 |
| 2016/0070034 A1 | 3/2016 | Oldham et al. | |
| 2017/0139137 A1* | 5/2017 | Lee | B05D 3/007 |

FOREIGN PATENT DOCUMENTS

KR 10-2012-0077417 A 7/2012
KR 10-1573724 B1 12/2015

* cited by examiner

*Primary Examiner* — Darryl J Collins
*Assistant Examiner* — Journey F Sumlar
(74) *Attorney, Agent, or Firm* — Sughrue Mion, PLLC (57) ABSTRACT

Nano antenna structures and methods of manufacturing the same are provided. A nano antenna structure includes a reflective layer, a transparent conductive layer disposed on the reflective layer, an insulating layer disposed on the transparent conductive layer, a nano antenna material layer disposed on the insulating layer, and an adhesion layer disposed between the insulating layer and the nano antenna material layer.

14 Claims, 7 Drawing Sheets

NANO ANTENNA STRUCTURE AND METHOD OF MANUFACTURING THE SAME

CROSS-REFERENCE TO RELATED APPLICATION

This application claims priority from Korean Patent Application No. 10-2016-0106988, filed on Aug. 23, 2016, in the Korean Intellectual Property Office, the disclosure of which is incorporated herein by reference in its entirety.

BACKGROUND

1. Field

Apparatuses and methods consistent with example embodiments relate to nano antenna structures and methods of manufacturing the same.

2. Description of the Related Art

A nano antenna may transmit and receive data by receiving light from the outside and changing the phase of the received light. When the light enters the nano antenna, resonance is generated, and the phase of light transmitted from the nano antenna may be changed according to a concentration change of carriers in a transparent conductive layer adjacent to a nano antenna material layer.

A nano antenna structure may be formed as a multi-layer structure, and a nano antenna material layer may include a conductive metal material. The conductive metal material may have a low adhesion characteristic with respect to a lower material layer. Accordingly, when patterning is performed by using an etching process and/or a lift-off process after forming the nano antenna material layer, the nano antenna material layer may be separated from the lower structure due to an exfoliating phenomenon.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide nano antenna structures having a nano antenna material layer with a high adhesion characteristic and methods of manufacturing the nano antenna structure.

Example embodiments provide nano antenna structures having a stable operation characteristic and a nano antenna material layer with a high adhesion characteristic and methods of manufacturing the nano antenna structure.

According to an aspect of an example embodiment, there is provided a nano antenna structure including a reflective layer, a transparent conductive layer disposed on the reflective layer, an insulating layer disposed on the transparent conductive layer, a nano antenna material layer disposed on the insulating layer, and an adhesion layer disposed between the insulating layer and the nano antenna material layer.

The adhesion layer may separate the nano antenna material layer from the insulating layer.

The adhesion layer may have an island shape or a dot shape, and a width of the adhesion layer may be less than a width of the nano antenna material layer.

The nano antenna material layer may directly contact the adhesion layer and the insulating layer.

The adhesion layer may include any one or any combination of Cr, Ti, and Ta.

A thickness of the adhesion layer may be greater than 0 nm and less than about 10 nm.

A thickness of the adhesion layer may be approximately less than or equal to a thickness of a monolayer.

According to an aspect of an example embodiment, there is provided a method of manufacturing a nano antenna structure, the method including sequentially forming a reflective layer, a transparent conductive layer, and an insulating layer, on a substrate, forming a mask layer exposing a portion of a surface of the insulating layer, on the insulating layer, forming an adhesion layer and a nano antenna material layer on the exposed portion of the surface of the insulating layer and on the mask layer, and removing the adhesion layer and the nano antenna material layer formed on the mask layer by removing the mask layer.

The adhesion layer and the nano antenna material layer may remain on the insulating layer.

A thickness of the adhesion layer may be greater than 0 nm and less than about 10 nm.

The adhesion layer may have an island shape or a dot shape.

A thickness of the adhesion layer may be approximately less than or equal to a thickness of a monolayer.

A width of the adhesion layer may be less than a width of the nano antenna material layer.

The adhesion layer may include any one or any combination of Cr, Ti, and Ta.

The forming of the mask layer may include forming the mask layer on the insulating layer, and forming a hole through the mask layer to expose the portion of the surface of the insulating layer.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

In the drawings, thicknesses of layers and regions may be exaggerated for clarity of layers and regions and also, like reference numerals refer to like elements throughout. It will be understood that when an element or layer is referred to as being "on" another element or layer, the element or layer may be directly on another element or layer or intervening elements or layers.

Figure 1:
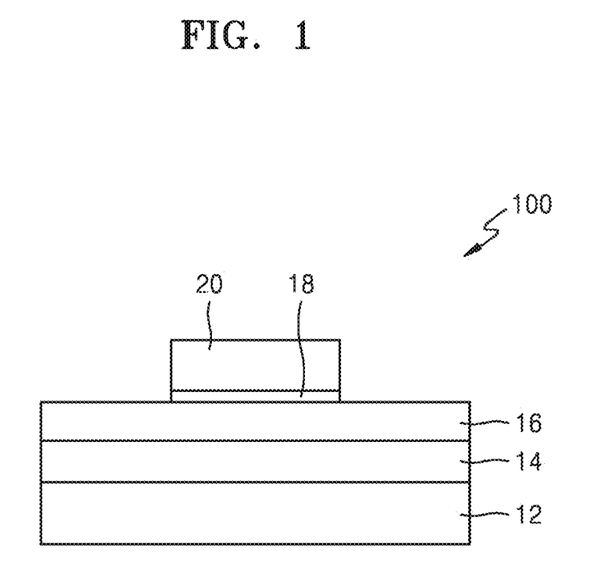
FIG. 1 is a schematic cross-sectional view of a nano antenna structure according to an example embodiment.

FIG. 1 is a schematic cross-sectional view of a nano antenna structure 100 according to an example embodiment.

Referring to FIG. 1, the nano antenna structure 100 according to the current example embodiment may include a reflective layer 12, a conductive layer 14, and an insulating layer 16 that are sequentially formed on the reflective layer 12. Also, the nano antenna structure 100 may further include an adhesion layer 18 and a nano antenna material layer 20 on the adhesion layer 18. The adhesion layer 18 and the nano antenna material layer 20 may have a patterned structure of a desired structure in a meta structure. The adhesion layer 18 and the nano antenna material layer 20 may have the same width. Also, the width of each of the adhesion layer 18 and the nano antenna material layer 20 may be less than those of the reflective layer 12, the conductive layer 14, and the insulating layer 16.

Figure 2:
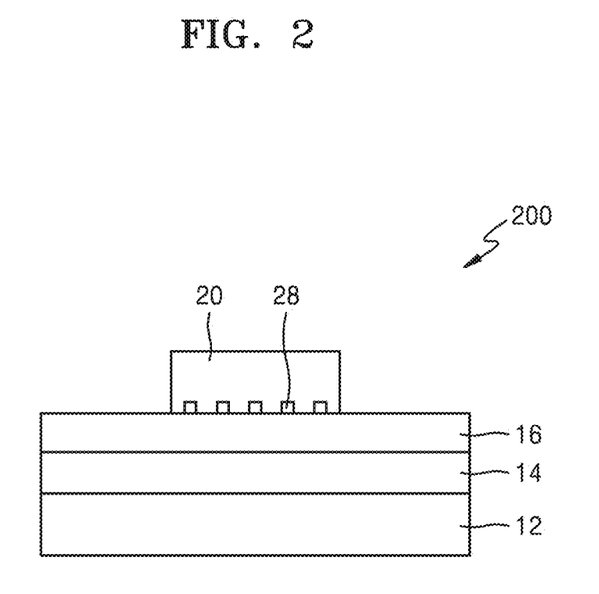
FIG. 2 is a schematic cross-sectional view of a nano antenna structure according to another example embodiment.

FIG. 2 is a schematic cross-sectional view of a nano antenna structure 200 according to another example embodiment.

Referring to FIG. 2, the nano antenna structure 200 according to the current example embodiment may include a reflective layer 12, a conductive layer 14, and an insulating layer 16 that are sequentially formed on the reflective layer 12. Also, the nano antenna structure 200 may further include an adhesion layer 28 and a nano antenna material layer 20 on the adhesion layer 28. The adhesion layer 18 and the nano antenna material layer 20 may have a patterned structure of a desired structure in a meta structure. The adhesion layer 18 and the nano antenna material layer 20 may have the same width. Also, the width of each of the adhesion layer 18 and the nano antenna material layer 20 may be relatively less than that of the reflective layer 12, the conductive layer 14, and the insulating layer 16.

As depicted in FIG. 1, the adhesion layer 18 may be formed to have the same width as the nano antenna material layer 20 through a patterning process together with the nano antenna material layer 20. However, as depicted in FIG. 2, the adhesion layer 28 may be formed in a discontinuous shape, that is, an island shape or a dot shape, on the insulating layer 16. In the nano antenna structure 100 of FIG. 1, the adhesion layer 18 is formed between the nano antenna material layer 20 and the insulating layer 16, and thus, the nano antenna structure 100 has a structure in which the nano antenna material layer 20 and the insulating layer 16 are separated from each other without contacting each other. However, in the nano antenna structure 200 of FIG. 2, because the adhesion layer 28 is formed in an island shape, the nano antenna structure 200 has a structure in which the nano antenna material layer 20 and the insulating layer 16 may contact each other in some regions. As depicted in FIG. 2, when the adhesion layer 28 is formed in an island shape or a dot shape on the insulating layer 16, the nano antenna material layer 20 may not be exfoliated from the insulating layer 16, that is, the nano antenna material layer 20 may be stably formed.

Hereinafter, materials of the layers of the nano antenna structures 100 and 200 of FIGS. 1 and 2 will now be described.

The reflective layer 12 may reflect light and may be a mirror layer. The reflective layer 12 may include at least one selected from the group consisting of Au, Ag, Pt, Cu, Al, Ni, Fe, Co, Zn, Ir, Ti, Ru, Rh, Pd, and Os. The reflective layer 12 may be formed on a separate substrate. The substrate may be a surface of an additional device on which one of the nano antenna structures 100 and 200 according to the current example embodiments is mounted.

The conductive layer 14 may include a transparent conductive material so that light may be transmitted therethrough, and may be referred to as a transparent conductive layer 14 including a transparent conductive oxide (TCO). For example, the transparent conductive layer 14 may include a transparent conductive material, such as indium tin oxide (ITO), indium zinc oxide (IZO), gallium indium zinc oxide (GIZO), indium gallium zinc oxide (IGZO), or hafnium oxide (HfOx).

The insulating layer 16 may include an insulating material, such as a metal oxide, for example, aluminum oxide, or a silicon oxide.

The adhesion layers 18 and 28 are formed to increase adhesiveness of the nano antenna material layer 20 to the insulating layer 16, and may include a conductive material, such as a metal. For example, the adhesion layers 18 and 28 may include Cr, Ti, or Ta.

The nano antenna material layer 20 may include, for example, Au.

A resonance phenomenon may occur at an interface between the insulating layer 16 and the nano antenna material layer 20 of each of the nano antenna structures 100 and 200 of FIGS. 1 and 2. Thus, an optical effect, for example, a phase change of light and proceeding direction change of light, etc. of the nano antenna material layer 20 with respect to light entering the nano antenna material layer 20, may be normally achieved. In the nano antenna structures 100 and 200 according to the current example embodiments, although the adhesion layers 18 and 28 respectively are formed between the insulating layer 16 and the nano antenna material layer 20, a resonance effect may occur at an interface between the insulating layer 16 and the nano antenna material layer 20, and thus, the optical effect of the nano antenna material layer 20 with respect to entering light may be maintained constant.

Figure 3A:
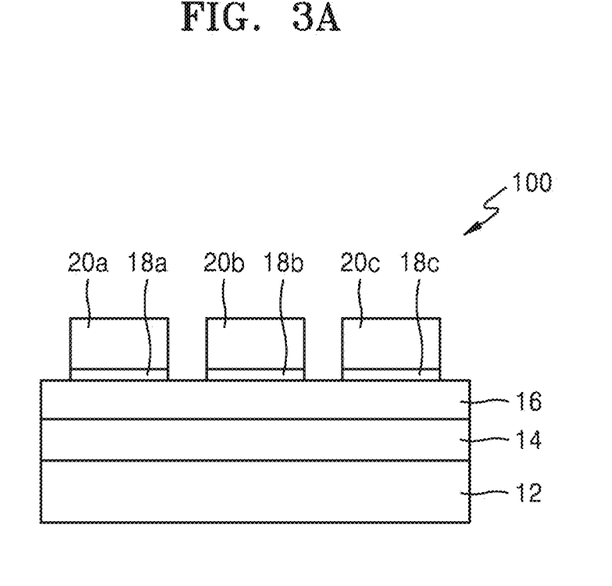
FIG. 3A is a schematic cross-sectional view of a modified version of the nano antenna structure of FIG. 1, according to another example embodiment.
Figure 3B:
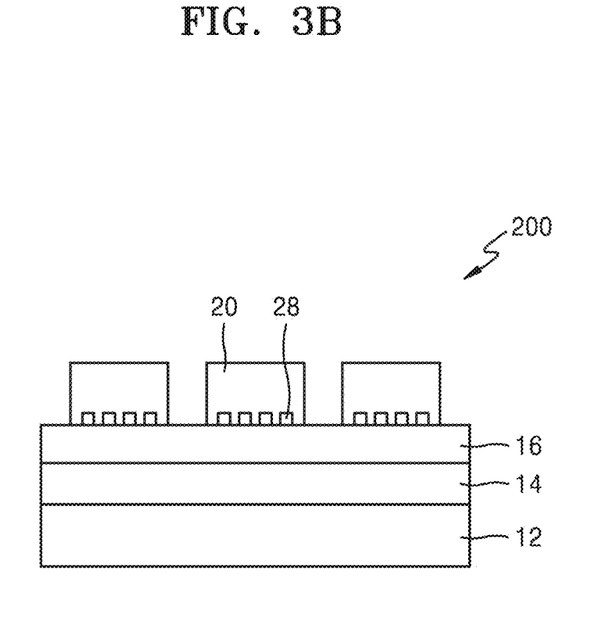
FIG. 3B is a schematic cross-sectional view of a modified version of the nano antenna structure of FIG. 2, according to another example embodiment.

FIG. 3A is a schematic cross-sectional view of a modified version of the nano antenna structure 100 of FIG. 1, according to another example embodiment. FIG. 3B is a schematic cross-sectional view of a modified version of the nano antenna structure 200 of FIG. 2, according to another example embodiment.

Referring to FIG. 3A, the modified versions of nano antenna structure 100 may include a plurality of adhesion layers 18a, 18b, and 18c and a plurality of nano antenna material layers 20a, 20b, and 20c respectively on the adhesion layers 18a, 18b, and 18c. Here, the adhesion layers 18a, 18b, and 18c and the nano antenna material layers 20a, 20b, and 20c have a predetermined shape patterned together by an etching process in a process of manufacturing the modified version of the nano antenna structure 100. However, the patterned shape is not limited thereto, and the nano antenna material layers 20a, 20b, and 20c may be patterned to have a meta structure. Also, as depicted in FIG. 3B, the adhesion layer 28 and the nano antenna material layer 20 may also be patterned to a desired shape as depicted in FIG. 3A.

FIGS. 4A, 4B, 4C, and 4D are schematic cross-sectional views illustrating a method of manufacturing the nano antenna structure 100, according to an example embodiment. Here, a method of manufacturing the nano antenna structure 100 of FIG. 1 according to an example embodiment will be described.

Figure 4A:
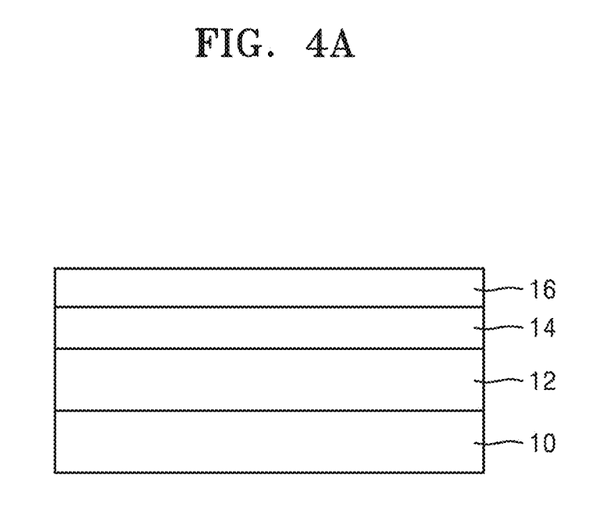
FIGS. 4A, 4B, 4C, and 4D are schematic cross-sectional views illustrating a method of manufacturing a nano antenna structure, according to an example embodiment.

Referring to FIG. 4A, the reflective layer 12 may be formed on a substrate 10 by including at least one selected from the group consisting of, Au, Ag, Pt, Cu, Al, Ni, Fe, Co, Zn, Ir, Ti, Ru, Rh, Pd, and Os. Next, the conductive layer 14 may be formed on the reflective layer 12 by including a transparent conductive material, such as ITO, IZO, GIZO, IGZO, or HfOx. Also, the insulating layer 16 is formed on the conductive layer 14 by including an aluminum oxide or a silicon oxide.

Figure 4B:
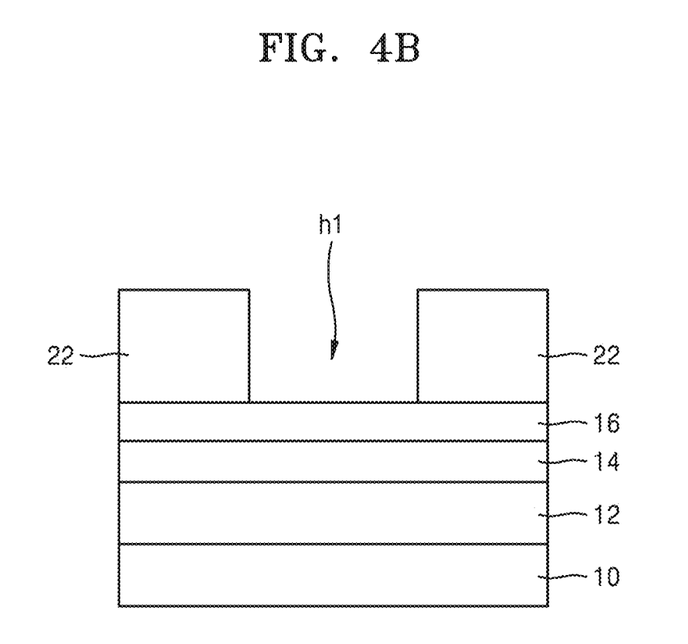

Referring to FIG. 4B, a mask layer 22 is formed on the insulating layer 16. The mask layer 22 may include a photoresist material. A hole h1 that exposes a surface of the insulating layer 16 may be formed in the mask layer 22. A region of the hole h1 may indicate a location of a nano antenna material layer in a subsequent process, and the region of forming the mask layer 22 may be determined taking into account the shape of the desired nano antenna material layer.

Figure 4C:
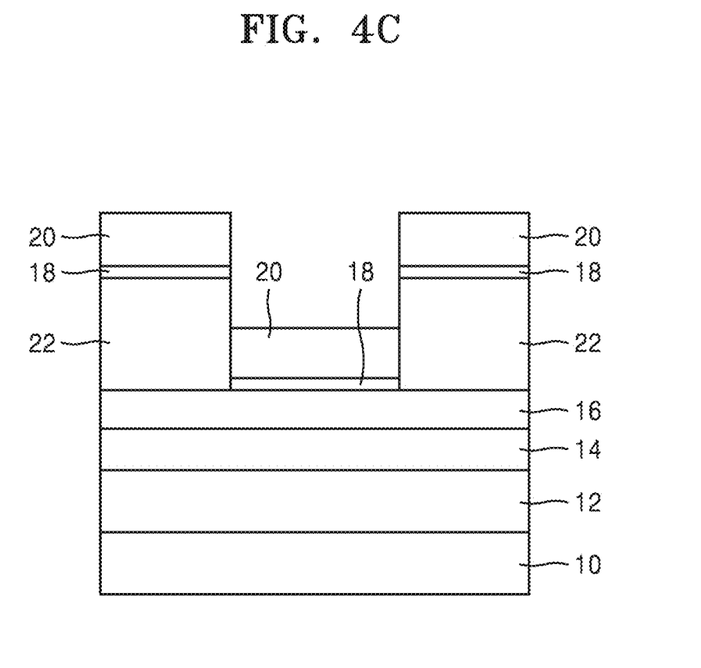

Referring to FIG. 4C, the adhesion layer 18 and the nano antenna material layer 20 are formed in the region (h1 of FIG. 4A) of the insulating layer 16 exposed between the mask layer 22. The adhesion layer 18 may be formed on the insulating layer 16 by using a material, such as Cr, Ti, or Ta. The adhesion layer 18 may have a very small thickness, for example, in a range from greater than 0 nm to not more than 10 nm. The adhesion layer 18 formed on the insulating layer 16 may have a thickness equal to or less than that of a monolayer including a single atom layer including a material such as Cr, Ti, or Ta. If the thickness of the adhesion layer 18 is large, as depicted in FIG. 1, the adhesion layer 18 may be formed to have the same width as the nano antenna material layer 20. Also, if the adhesion layer 18 has a thickness less than that of the monolayer, as depicted in FIG. 2, the adhesion layer 18 may be formed in an island shape or a dot shape. When the adhesion layer 18 has a thickness less than that of the monolayer, the adhesion layer 18 may not be formed on a portion of a surface region of the insulating layer 16. Also, in this case, the adhesion layer 18 may not be formed in other portions of the remaining surface region of the insulating layer 16. Also, optionally, after forming a very thin adhesion layer 18 on the surface region of the insulating layer 16, as depicted in FIG. 2, the adhesion layer 28 may be formed as an island shape or a dot shape by patterning the adhesion layer 18.

Figure 4D:
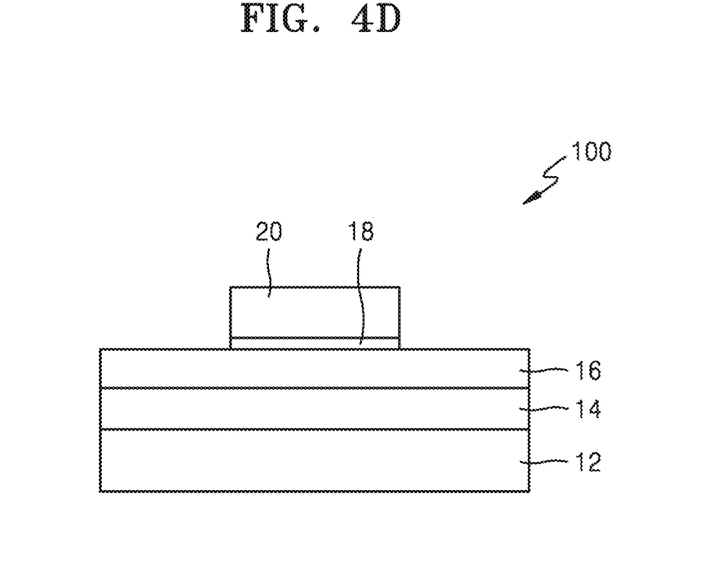

Next, referring to FIG. 4D, to remove the adhesion layer 18 and the nano antenna material layer 20 formed on the mask layer 22, the mask layer 22 may be removed by performing, for example, a lift-off process. While the lift-off process is performed, the nano antenna material layer 20 may be stably located on the insulating layer 16 without being exfoliated from the insulating layer 16 due to the adhesion layer 18.

Figure 5:
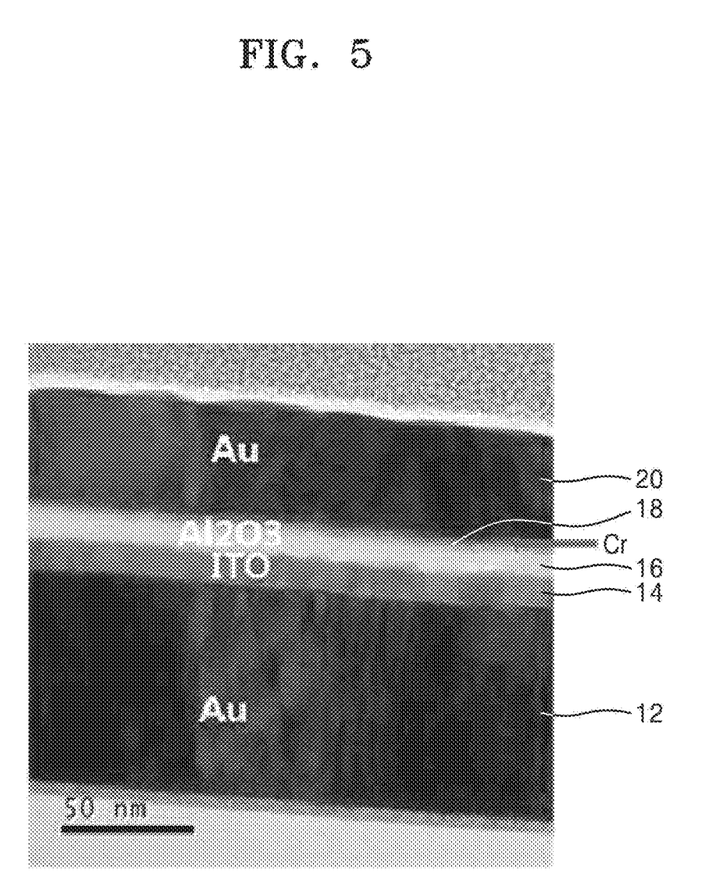
FIG. 5 is a transmission electron microscope (TEM) image of a nano antenna structure manufactured by using a manufacturing method according to an example embodiment.

FIG. 5 is a transmission electron microscope (TEM) image of a nano antenna structure manufactured by using a manufacturing method according to an example embodiment.

Referring to FIG. 5, the TEM image includes a transparent conductive layer 14 including ITO on a reflective layer 12 including Au, an insulating layer 16 including $Al_2O_3$ on the transparent conductive layer 14, an adhesion layer 18 including Cr on the insulating layer 16 including $Al_2O_3$, and a nano antenna material layer 20 including Au on the adhesion layer 18. In FIG. 5, the adhesion layer 18 including Cr formed between the insulating layer 16 including $Al_2O_3$ and the nano antenna material layer 20 including Au has a very small thickness, and due to the formation of the adhesion layer 18, the nano antenna material layer 20 may be stably located on the insulating layer 16 without being exfoliated in a patterning process.

Figure 6A:
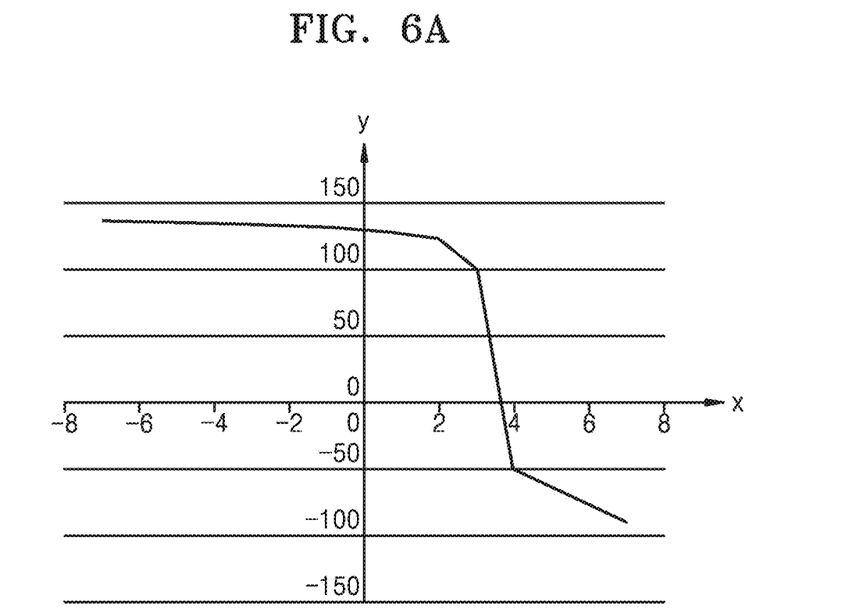
FIGS. 6A and 6B are graphs showing phase differences according to a voltage applied to a nano antenna structure, depending on the existence of an adhesive layer.
Figure 6B:
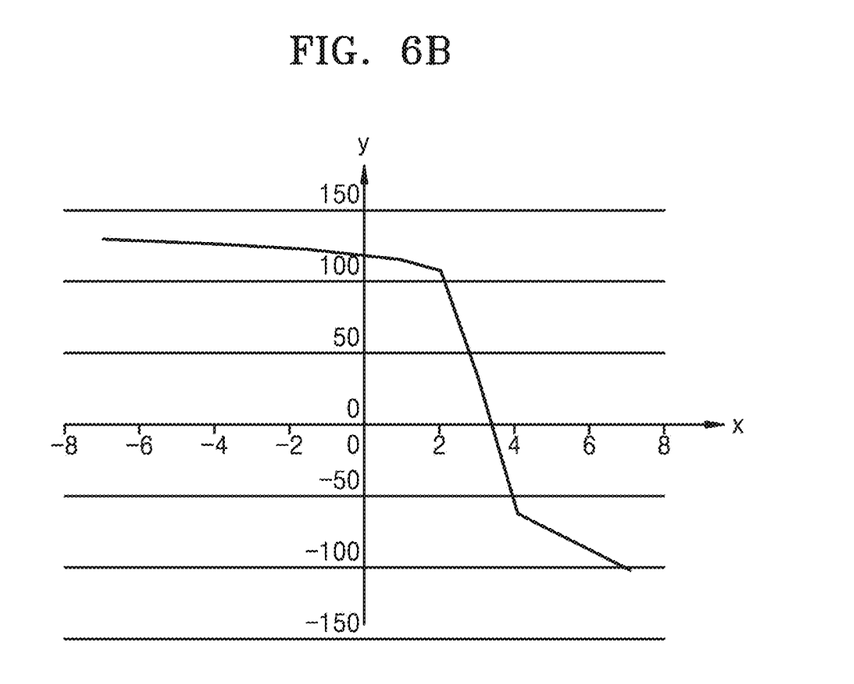

FIGS. 6A and 6B are graphs showing phase differences according to a voltage applied to a nano antenna structure, depending on an existence of an adhesive layer. A nano antenna structure includes the transparent conductive layer 14 including ITO on the reflective layer 12 including Au, the insulating layer 16 including $Al_2O_3$ on the transparent conductive layer 14 including ITO, and the nano antenna material layer 20 including Au on the insulating layer 16 including $Al_2O_3$. FIG. 6A shows a phase difference of the nano antenna structure according to a voltage when the nano antenna structure includes the adhesion layer 18 including Cr, and FIG. 6B shows a phase difference of the nano antenna structure according to a voltage when the nano antenna structure does not include the adhesion layer 18.

Referring to FIGS. 6A and 6B, it is confirmed that in both cases when the nano antenna structure includes the adhesion layer 18 including Cr and the nano antenna structure does not include the adhesion layer 18, the phase difference (a y axis) according to the voltage change (an x axis) is similar to each other, that is, approximately 225 degrees. Thus, when the adhesion layer 18 including Cr is formed between the insulating layer 16 and the nano antenna material layer 20 of the nano antenna structure, it is confirmed that the exfoliation of the nano antenna material layer 20 from the insulating layer 16 may be prevented and there is no problem of operational characteristic as a nano antenna.

Figure 7:
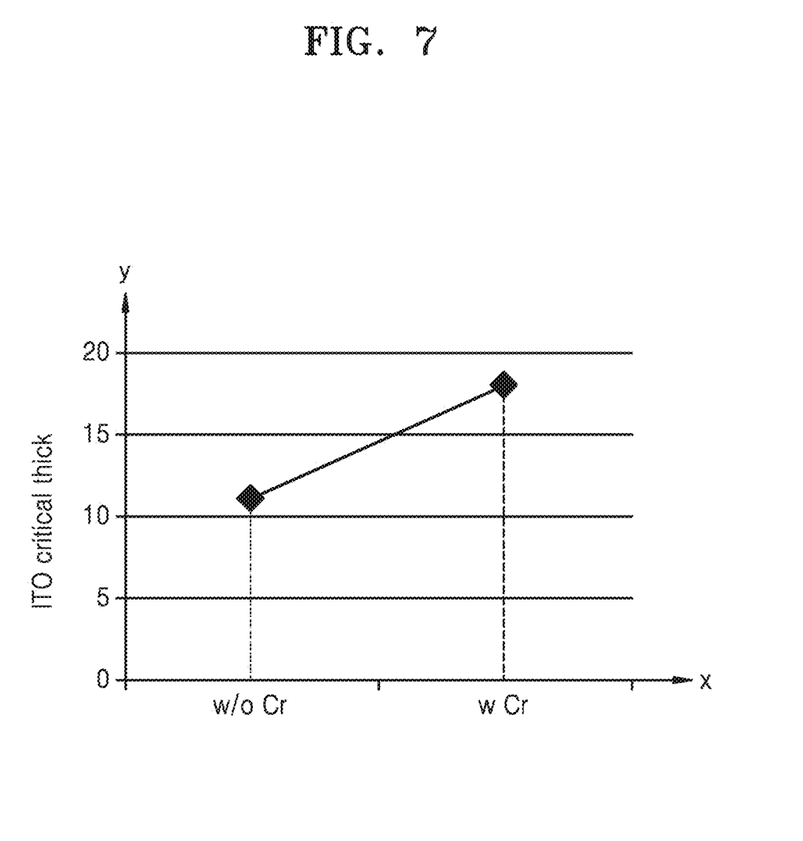
FIG. 7 is a graph showing a thickness of a transparent conductive layer having a maximum phase difference with respect to an adhesive layer.

FIG. 7 is a graph showing a thickness of the transparent conductive layer 14 having a maximum phase difference of the adhesive layer 18.

Referring to FIG. 7, when the nano antenna structure includes the adhesion layer 18 including Cr (wCr) and does not include the adhesion layer 18 including Cr (w/oCr) between the insulating layer 16 and the nano antenna material layer 20, a thickness of the transparent conductive layer 14 including ITO may not fall into line. However, simply, the same phase difference may be ensured by changing the thickness of the transparent conductive layer 14 including ITO in both cases when the nano antenna structure includes the adhesion layer 18 including Cr (wCr) and does not include the adhesion layer 18 including Cr (w/oCr) between the insulating layer 16 and the nano antenna material layer 20.

The nano antenna structure described above may ensure a stable operational characteristic thereof by including an adhesion layer between an insulating layer and a nano antenna material layer to prevent the nano antenna material layer from exfoliating from the insulating layer.

Also, the adhesion layer that prevents the nano antenna material layer from exfoliating from the insulating layer does not reduce the operational characteristic of the nano antenna structure, and the operational characteristic of the nano antenna structure may be normally maintained without an additional process for removing the adhesion layer.

While example embodiments have been described with reference to the figures, it will be understood by those of ordinary skill in the art that various changes in form and details may be made therein without departing from the spirit and scope as defined by the following claims.

What is claimed is:

1. A nano antenna structure comprising:
a reflective layer;
a transparent conductive layer disposed on the reflective layer;
an insulating layer disposed on the transparent conductive layer;
a nano antenna material layer disposed on the insulating layer; and
an adhesion layer disposed between the insulating layer and the nano antenna material layer, the adhesion layer comprising discontinuous portions,
wherein a cross-sectional width of the adhesion layer is less than a cross-sectional width of the nano antenna material layer.

2. The nano antenna structure of claim 1, wherein the adhesion layer separates the nano antenna material layer from the insulating layer.

3. The nano antenna structure of claim 1, wherein the adhesion layer has an island shape or a dot shape.

4. The nano antenna structure of claim 1, wherein the nano antenna material layer directly contacts the adhesion layer and directly contacts the insulating layer.

5. The nano antenna structure of claim 1, wherein the adhesion layer comprises any one or any combination of Cr, Ti, and Ta.

6. The nano antenna structure of claim 1, wherein a thickness of the adhesion layer is greater than 0 nm and less than about 10 nm.

7. The nano antenna structure of claim 1, wherein a thickness of the adhesion layer is approximately less than or equal to a thickness of a monolayer.

8. A method of manufacturing a nano antenna structure, the method comprising:

sequentially forming a reflective layer, a transparent conductive layer, and an insulating layer, on a substrate;
forming a mask layer on the insulating layer;
forming a hole through the mask layer to expose a portion of a surface of the insulating layer;
forming an adhesion layer on the exposed portion of the surface of the insulating layer and on the mask layer through which the hole is formed;
forming a nano antenna material layer on the adhesion layer formed on the exposed portion of the surface of the insulating layer and on the mask layer through which the hole is formed; and
removing the mask layer through which the hole is formed, to remove the adhesion layer formed on the mask layer through which the hole is formed and to remove the nano antenna material layer formed on the mask layer through which the hole is formed.

9. The method of claim 8, wherein the adhesion layer remains on the exposed portion of the surface of the insulating layer, and
the nano antenna material layer remains on the adhesion layer formed on the exposed portion of the surface of the insulating layer.

10. The method of claim 8, wherein a thickness of the adhesion layer is greater than 0 nm and less than about 10 nm.

11. The method of claim 8, wherein the adhesion layer has an island shape or a dot shape.

12. The method of claim 11, wherein a thickness of the adhesion layer is approximately less than or equal to a thickness of a monolayer.

13. The method of claim 11, wherein a width of the adhesion layer is less than a width of the nano antenna material layer.

14. The method of claim 8, wherein the adhesion layer comprises any one or any combination of Cr, Ti, and Ta.

* * * * *